W. P. CLEMENTS.
Seed-Planter.
No. 8,408.　　　　　　　　　　　　　Patented Oct. 7, 1851
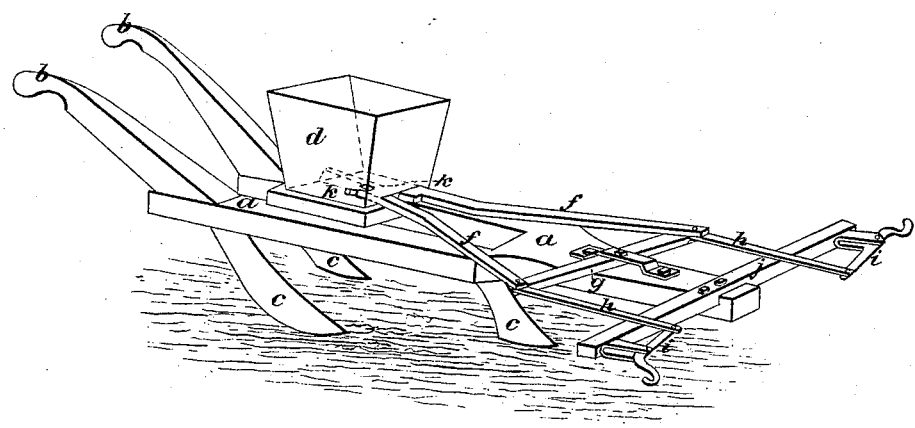

UNITED STATES PATENT OFFICE.

WM. P. CLEMENTS, OF ELLERSLIE, GEORGIA.

IMPROVEMENT IN DEVICES FOR SOWING IN A SEED-PLANTER.

Specification forming part of Letters Patent No. 8,408, dated October 7, 1851.

*To all whom it may concern:*

Be it known that I, W. P. CLEMENTS, of Ellerslie, in the county of Harris and State of Georgia, have invented a new and useful Improvement in the Construction of Seed-Drills for Planting Corn, Cotton, and other Seed; and I do hereby declare that the following is a full, clear, and exact description thereof, reference being had to the accompanying drawing and letters marked thereon, forming a part of this specification.

The nature of my invention consists in the novel manner of availing of the natural motion of the shoulders of a horse or other animal, while walking and propelling a drill, to operate the seed-dischargers, so that at each step of the animal its shoulder-blades shall act alternately upon levers reciprocating the arms working inside the hopper, so as to discharge the desired quantity of seed without the aid of wheels, cams, or any other machinery than the simple arrangement represented in the drawing, which is not more complicated or more liable to get out of order than an ordinary plow.

In the accompanying drawing I have represented my drill for planting corn; but by a little variation in the machinery it can be equally well adapted to the planting of cotton and other seed.

$a\ a$ is the frame or beam of the drill; $b\ b$, the helves; $c\ c$, the plows or drills.

The hopper $d$ is placed in the middle of the beam. It has a bottom with a partition rising one or two inches, which serves as a guide for the seed-dischargers sliding on each side of it.

$f f$ are the arms or seed-dischargers, which are jointed to the lever $g$, having its fulcrum on the beam of the drill. This lever is connected and jointed with rods $h\ h$ and two other levers, $i\ i$, having their fulcrums or arms firmly attached to and projecting from the cross-beam $j$.

The horse or horses are geared in the usual manner, the traces hitching over the short arms of the levers $i\ i$, and attached to the collar on the horse's neck in the usual manner, so as to be operated upon by the shoulders of the horse when in the act of walking.

The operation of my drill is obviously as follows: As the horse steps out each shoulder-blade, moving the collar forward, alternately acts upon one of the levers $i\ i$ through the medium of the traces, which draws forward the arms or seed-dischargers, in the ends of which terminating inside the hopper, are cut notches sufficiently large to hold the desired quantity of seed to be dropped, so that the seed will fall out when the notches are alternately drawn outside of the hopper, one of which is so represented in the drawing. Thus the arms are alternately reciprocated, discharging at each step of the horse the desired quantity of seed with great regularity and precision. The notches can be made of any desired capacity. The grain is apt to collect on the dischargers and prevent their free action, to obviate which I place small pieces of leather $k\ k$, or other elastic substance, through mortises in the side of the hopper, which serve to scrape and clear the dischargers, and prevent choking or crushing the grain.

Having thus described the construction and operation of my drill, what I claim therein as new, and desire to secure by Letters Patent, is—

The novel manner of discharging the seed by the natural motion of the horse or animal while in the act of walking and propelling the drill, without the aid of wheels, with the arrangement of levers, arms, &c., for discharging the seed, or their equivalents, operating in the manner and for the purpose herein fully set forth and represented.

In testimony whereof I have hereunto signed my name before two subscribing witnesses.

W. P. CLEMENTS.

Witnesses:
 THO. DONOHO,
 GEO. R. WEST.